July 7, 1925.  1,545,283

F. X. SCHUHBAUER ET AL

VEHICLE HEADLIGHT DEVICE

Filed April 23, 1924     2 Sheets-Sheet 1

Frank X. Schuhbauer,
Frederick Portmann,   INVENTORS

BY

Geo. T. Kimmel   ATTORNEY.

July 7, 1925. 1,545,283
F. X. SCHUHBAUER ET AL
VEHICLE HEADLIGHT DEVICE
Filed April 23, 1924 2 Sheets-Sheet 2
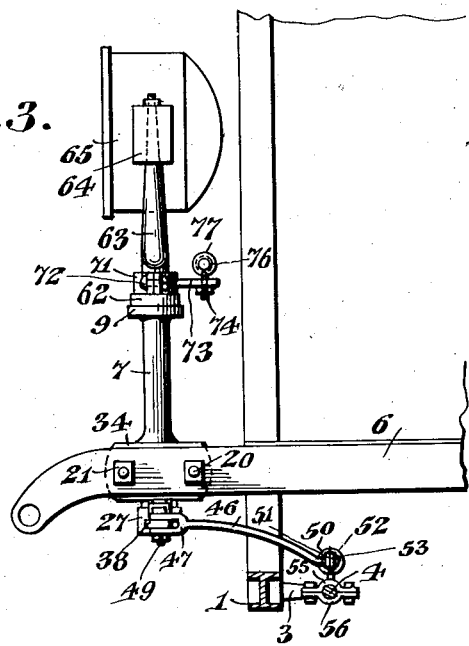
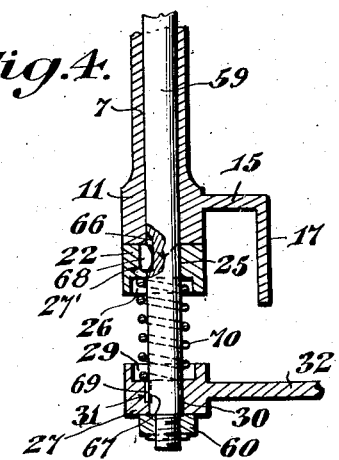
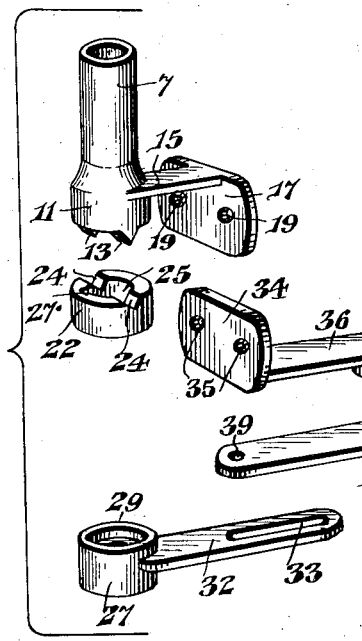
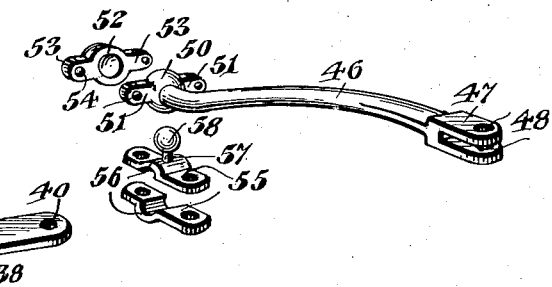
Frank X. Schuhbauer, INVENTORS
Frederich Portmann,
BY
Geo. P. Kimmel, ATTORNEY.

Patented July 7, 1925.

1,545,283

UNITED STATES PATENT OFFICE.

FRANK X. SCHUHBAUER AND FREDERICH PORTMANN, OF BUTTE, MONTANA.

VEHICLE HEADLIGHT DEVICE.

Application filed April 23, 1924. Serial No. 708,416.

*To all whom it may concern:*

Be it known that we, FRANK X. SCHUH-BAUER, a citizen of the United States, and FREDERICH PORTMANN, a citizen of Switzerland, residing at Butte, in the county of Silver Bow and State of Montana, have invented certain new and useful Improvements in Vehicle Headlight Devices, of which the following is a specification.

This invention relates to vehicle headlight devices and pertains particularly to that class of headlights known as dirigible headlights.

The primary object of this invention is the provision, in a manner as hereinafter set forth, of a dirigible vehicle headlight of an improved structure whereby the light will be swung simultaneously with the swinging of the front wheels of the vehicle to project the light in the direction indicated by the position assumed by the front wheels.

Another object of the invention is the provision, in a manner as hereinafter set forth, of a dirigible headlight having an improved means whereby the headlight when brought to a position to project the light directly forward of the vehicle, will be automatically locked in this position so long as the steering wheels are directed to guide the vehicle in a straight line.

A still further object of the invention is the provision, in a manner as hereinafter set forth, of a dirigible headlight having an improved supporting means and improved link connecting mechanism between the lights and the connecting rod between the steering arm of the vehicle wheels.

A still further and final object of the invention is the provision, in a manner as hereinafter set forth, of a dirigible headlight of sturdy structure, easily applicable to the vehicle, not complicated in structure, having an extremely easy action, and inexpensive to manufacture and install.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claim.

In the drawings:

Figure 3 is a side elevation of the same.

Figure 4 is a longitudinal sectional view through the lower portion of the sleeve which surrounds the vertical lamp supporting shaft, and the spring pressed locking means by which the light is held steadily in the forwardly directed position when the vehicle is traveling in a straight line.

Figure 5 is a detail perspective view of the separated parts of the controlling mechanism and the supporting bracket for one of the lamps and a portion of the mechanism.

Figure 6 is a detail perspective view of the connecting arm which connects the connecting rod with the lamp mechanism showing the clamps used to connect the arm with the connecting rod.

Figure 7 is a side elevation of one of the lamp forks, the lamp being removed, showing the back of the support in sectional view to show the manner in which the supports are connected together.

Figure 1:
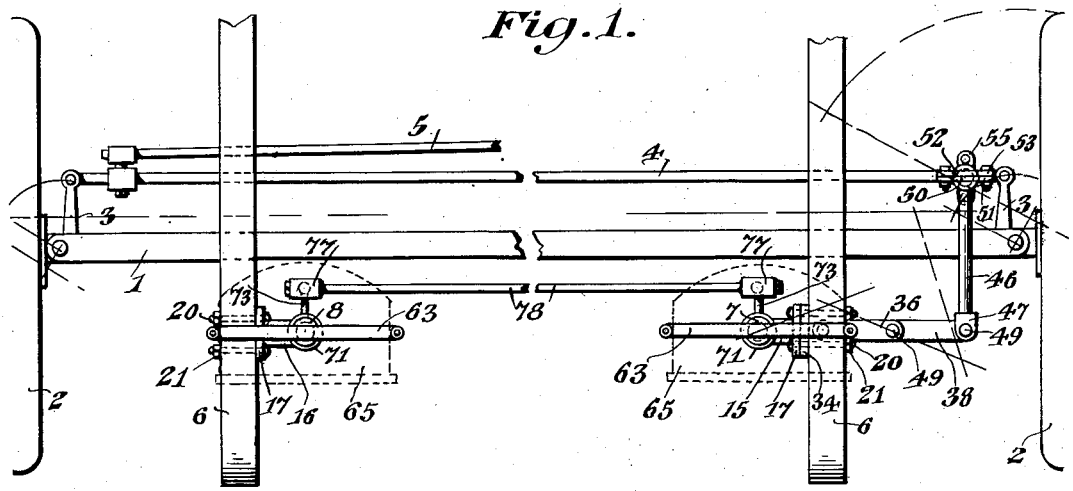
Figure 1 is a top plan view of the mechanism embodying this invention shown as applied and connected to the front portion of a vehicle.

Referring now to the drawings in detail wherein like numerals of reference indicate corresponding parts throughout the several views of the drawings, the front axle of a vehicle is indicated at 1 carrying at each end the usual front wheels 2, the securing knuckles 3 connected by the connecting rod 4 to which is attached the steering rod 5 which extends through the steering post of the vehicle (not shown). Extending across and beyond the axle 1 is shown the forward end of the side beams of the chassis frame 6.

Figure 2:
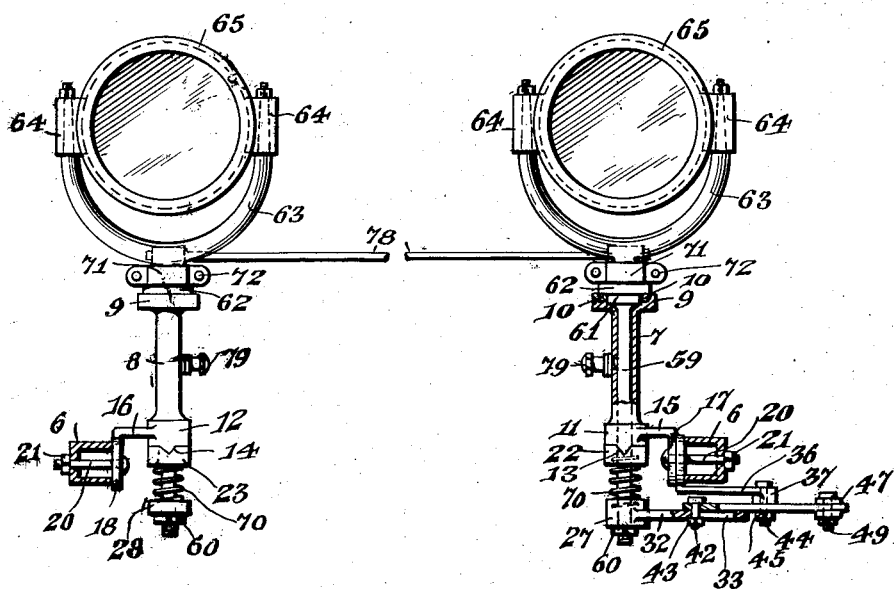
Figure 2 is a front elevation of the device embodying this invention.

The device embodying this invention comprises a pair of vertically positioned bearing sleeves 7 and 8, respectively, the upper end of each being enlarged and recessed upon its upper side to provide a ball race 9 for positioning therein bearing balls 10. The lower end of each sleeve has an enlarged annular terminus 11 and 12, respectively, each having formed upon its lower edge depending teeth 13 and 14, respectively, diametrically oppositely positioned as shown. Each of the enlarged lower portions 11 and 12 further has extending at right angles therefrom an angle bracket comprising a horizontal arm 15 and vertical arm 16, each carrying at its outer end a depending substantially elongated transversely extending plate 17 and 18. Each of these plates has formed therethrough a pair of bolt apertures 19. The plates 17 and 18 are each adapted to be secured to the inner side of the forwardly extending portions of the side beams 6 of the chassis frame as shown in Figure 2 to support the sleeves 7 and 8 in vertical position. The plates are secured to the beams by means of bolt members 20 which are passed through the apertures 19 in the plates 17 and 18, and through the chassis beams 6 and secured thereto by means of the nuts 21 which bear against the outer face of the chassis beams. Located below and in alignment with each of the enlarged lower ends 11 and 12 of the sleeves 7 and 8 are notched collars 22 and 23, respectively, each having the diametrically oppositely positioned notches in their upper edges as indicated at 24 and 25 to receive therein the teeth 13 and 14 of the member thereabove. The notched collars 22 and 23 have relatively narrow bores through the upper portions thereof as indicated at 25 in Figure 4, and have at their lower sides or ends a shallow bore of greater diameter than the diameter of the bore 25, as indicated at 26. Each of the collars has formed in the wall of the bore of smaller diameter a key-way 27'.

Located beneath and in alignment with the notched collars 22 and 23, and spaced therefrom are other collars 27 and 28, respectively, each having formed in its upper end a bore of a diameter equal to the diameter of the bore 26, as indicated at 29, and extending from these bores of large diameter are other bores of smaller diameter which continue through the body of the collar and open out upon the lower end thereof as indicated at 30. Each of these bores of smaller diameter has formed in the wall thereof a key-way 31 similar to the key-way 27' in the collars 22 and 23. The collar 27 has formed integral therewith and extending laterally from the side thereof a flat arm 32 having formed therein a longitudinally extending slot 33 which slot terminates adjacent the outer end of the arm, as clearly shown in Figure 5 of the drawings.

Adapted to be secured to the inner face of one chassis beam 6 by means of the bolts 20 which secure the plate 17 thereto is a bracket member comprising a substantially elongated vertically positioned plate 34, similar to the plate 17 and having apertures 35 therethrough which are adapted to align with the apertures 19 in the plate 17. Extending at right angles from the lower edge of this plate 34 is a substantially elongated arm 36 having formed at the outer end thereof and upon the under side, a sleeve 37.

A link member 38 having apertures 39 and 40, respectively, through each end thereof, and a central aperture 41, has passed through the aperture 39 in the inner end the bolt 42 which bolt further extends through the slot 33 and is secured beneath the arm 32 by means of the nut 43. The aperture 41 in the link 38 is located beneath the sleeve 37 carried by the arm 36 and there is passed through the sleeve and through the aperture 41 a bolt 44 secured by the nut 45 by means of which the link is centrally pivoted to the lower end of the sleeve 37.

Extending from the connecting rod 4 to the outer end of the link 38 is an actuating arm 46 bifurcated at its outer end as indicated at 47 and having aligned apertures 48 through each of the furcations. The outer end of the link 38 is adapted to position between the furcations of the bifurcated end 47 and a bolt member 49 is passed therethrough to pivotally secure the link between the furcations. The inner end of the connecting or actuating bar 46 has a semicircular cup-shaped head 50 which head has the oppositely extending ears 51 integral therewith, and adapted to fit over the cup-shaped face of the head 50 is a semicircular cover element 52 having similar oppositely extending lateral ears 53 which coincide with the ears 51 and which have passed through the apertures 54 appropriate securing means to hold the parts together. A two-part clamp member 55, having the central semicircular portion 56, is provided to fit over the connecting rod 4, and one of the halves of the clamping member 55 is provided with a vertical stud 57 which terminates in the ball 58 which is adapted to be clamped between the head 50 and the cup-shaped cover 52, to provide a ball and socket connection between the actuating arm 46 and the connecting rod 4.

Extending through each of the sleeves 7 and 8 is a vertical shaft 59, each shaft extending through the notched collars and the other collars located beneath the notched collars and secured beneath the lower collar members by means of nuts 60. The upper end of each shaft 59 is enlarged as at 61 to seat in the ball race 9 and above this enlarged portion is a second annular portion of still greater diameter than the portion 61 as shown at 62, this enlarged portion being adapted to rest upon the balls 10 to give a smooth revolving action to the shaft. Each shaft 59 terminates at its upper end in the forks 63 which have their terminal ends constricted to pass through lateral ears 64 of light projectors 65. A conventional form of light and support is shown here at the upper end of the shaft 59 and applicants do not desire to limit themselves to this form of support and headlight, but it is to be understood that any other type of headlight may be supported at the upper end of the shaft as desired.

Each of the shafts 59 has formed adjacent its lower end a pair of key-ways 66 and 67, respectively, having keys 68 and 69 therein, the key 68 engaging the key-way 27' in the collars 22 and 23, the key 69 engaging in the key-ways 31 in the collars 27 and 28. Positioned between and spacing the collars 22 and 23 from the collars 27 and 28 and surrounding the shafts 59 and further having its ends located within the enlarged bores 26 and 29 is a helical spring 70, this spring bearing down against the collars 27 and 28 and acting to force the collars 22 and 23 upwardly to always maintain a positive connection between the teeth 13 and 14 and the notches 24 and 25 of the collar, that is, when the wheels of the vehicle are directing the car in a straight forward movement.

Clamped about each of the shafts 59 beneath the forks 63, is a two-part clamp member 71, each part having the laterally extending abutting ears 72 which are adapted to be secured together in any appropriate manner, and one of the halves of the clamping member 71 has extending therefrom an arm 73 having an aperture therethrough, and through this aperture is passed a stud 74 secured at the lower end by a nut 75 and carrying a ball 76 at its upper end, the ball of the stud carried by the rear half of each of the members 72 being engaged in a suitable socketed head 77 formed at each end of a lamp connecting rod 78 which connects the lamps to swing the same simultaneously.

In Figure 7 there is shown a slight modification of the arm 73, the arm 73' here shown is shown as being connected directly to the shaft 59 beneath the fork 63 instead of being carried by one-half of the clamping member as is shown in the other views. The remainder of the structure is the same as described for the other views.

Secured to each of the sleeves 7 and 8 intermediate its end is a grease cup 79 adapted to force grease into the sleeve between the same and the shaft 59 extending therethrough.

Having thus described our invention what we claim is:

In a dirigible headlight, the combination with a vehicle including a front axle, a chassis frame extending thereover, wheels carried on said axle and a transversely moving connecting rod for shifting said wheels of, a pair of sleeves each having an angle bracket for connecting the same to one side of a chassis frame, a pair of diametrically oppositely positioned teeth formed upon the lower edge of each of said sleeves, a revoluble shaft extending through each sleeve for the support of a light projector, means to provide a pair of superposed collars keyed to said shaft below said sleeve, the upper of said collars each having in its top edge diametrically oppositely positioned notches to receive said teeth, means interposed between said upper and lower collars for constantly forcing the upper collar against the end of said sleeve, means carried by one of the lower of said collars to provide a sliding engagement with one end of a centrally pivoted link member, an actuating rod pivotally connected at one end to the outer end of said link and pivotally engaged at its other end to said connecting rod, and means pivotally connecting the vertical shaft for causing simultaneous movement thereof.

In testimony whereof, we affix our signatures hereto.

FRANK X. SCHUHBAUER.
FREDERICH PORTMANN.